United States Patent [19] [11] 4,243,705
Yapp et al. [45] Jan. 6, 1981

[54] PROCESS FOR COATING HIGH SOLIDS COATING COMPOSITIONS

[75] Inventors: William J. Yapp, Park Forest; Robert E. McDonald, Calumet City, both of Ill.

[73] Assignee: The Sherwin-Williams Company, Cleveland, Ohio

[21] Appl. No.: 858,914

[22] Filed: Dec. 8, 1977

Related U.S. Application Data

[62] Division of Ser. No. 577,830, May 15, 1975, Pat. No. 4,169,825.

[51] Int. Cl.³ .............................................. B05D 3/02
[52] U.S. Cl. ...................................... 427/386; 427/27; 427/387; 427/388.2; 427/388.3; 427/420; 427/421; 427/429; 427/435; 525/438; 525/440
[58] Field of Search ............. 427/386, 387, 27, 388.2, 427/388.3, 420, 421, 429, 435; 260/850, 834; 525/438, 440

[56] References Cited

U.S. PATENT DOCUMENTS

| | | | |
|---|---|---|---|
| 3,410,926 | 11/1968 | Hicks | 427/386 |
| 3,516,955 | 6/1970 | Taft | 427/386 X |
| 3,719,725 | 3/1973 | Murakami et al. | 260/835 X |
| 3,852,275 | 12/1974 | Biethan et al. | 260/850 |
| 3,922,447 | 11/1975 | Isaksen et al. | 260/850 X |
| 3,959,201 | 5/1976 | Chang | 260/850 X |
| 3,978,015 | 8/1976 | Kolish et al. | 260/850 X |
| 3,978,153 | 8/1976 | Sato et al. | 260/835 |
| 3,989,767 | 11/1976 | Homma et al. | 260/834 |
| 4,027,066 | 5/1977 | Victorius | 428/334 |

FOREIGN PATENT DOCUMENTS 2514338 10/1976 Fed. Rep. of Germany .......... 427/386

Primary Examiner—Ronald H. Smith
Assistant Examiner—Thurman K. Page
Attorney, Agent, or Firm—James V. Tura; Robert E. McDonald

[57] ABSTRACT

This invention is directed to a high solids coating composition and more specifically to a coating comprising low molecular weight hydroxy-containing polyesters, an epoxy resin and at least one crosslinking agent consisting of an isocyanate, an alkoxy alkyl melamine, or an amino condensation product.

5 Claims, No Drawings

PROCESS FOR COATING HIGH SOLIDS COATING COMPOSITIONS

BACKGROUND

This is a division of application Ser. No. 577,830 filed May 15, 1975, now U.S. Pat. No. 4,169,825.

This invention relates to high solids polyester-containing coating compositions and more specifically to non-volatile coating compositions particularly useful in the architectural and appliance industry. More specifically, this invention relates to high solids coating compositions and to a process for applying a polyester-containing coating on various substrates and particularly on metal substrates. In preparing coatings, e.g. for the appliance industry, etc. it is important that the compositions remain stable at temperatures ranging up to 250° F. or higher and are capable of being applied at these temperatures by conventional methods, onto a variety of surfaces. It is important also that these coating compositions have a maximum cure temperature of about 400° F., are flexible, have good adhesion characteristics, have a gloss ranging from about 85 to 90 and are substantially stain resistant. Recently, the trend has been toward strict controls and legislation which prohibits the emission of solvents, e.g. hydrocarbons into the environment particularly since it is known that some hydrocarbons are photochemically reactive and, therefore, enhance the problems related to emissions. Thus, to minimize the pollution problems, the coating industry has made a considerable effort toward eliminating or at least reduce the amount of emissions by resorting to water-based coatings or to the use of coatings which are substantially free of organic solvents.

SUMMARY

To avoid pollution and related problems of solvent based coatings, it has been found in accordance with this invention that a non-volatile, high solids coating particularly useful in the appliance industry can be obtained by using a comparatively low molecular weight polyester having a hydroxyl content ranging up to about 12% by weight in combination with an epoxy resin. The polyester and epoxy resin mixture is crosslinked at increased temperatures, e.g. with an amino condensation product and, if needed, blended further with a lesser amount of styrene copolymer.

Accordingly, it is an object of this invention to provide a high solids substantially non-volatile composition comprising a low molecular weight polyester, an epoxy resin and a crosslinking agent particularly useful as a coating in the appliance and architectural industry. It is another object of this invention to provide a high-solids coating composition containing minimum amounts of solvent which may be applied to a substrate by conventional methods at increased temperatures to provide a durable film characterized as having good flexibility, good adhesion and one which is substantially resistant to stain. It is a further object of this invention to provide a method of coating various substrates with a high-solids composition, e.g. containing less than about 20% by weight of a volatile solvent at temperatures ranging up to a 250° F. by utilizing conventional coating equipment and techniques. These and other objects of the invention will become apparent from a further and more detailed description.

DETAILED DESCRIPTION

More specifically, this invention relates to a high solids coating, e.g. containing less than about 20% by weight of a volatile solvent which comprises from about 50 to 80 parts by weight and preferably from about 60 to 70 parts by weight of at least one polyester having an average molecular weight ranging up to about 1200, e.g. 200 to 1000 and a hydroxyl content ranging from about 2.0% to 12%, from about 2.0 to 10 parts by weight and preferably from 3.0 to 6.0 parts by weight of an epoxy resin or polyepoxide, and from about 10 to 40 parts by weight and preferably from about 20 to 30 parts by weight of at least one crosslinking agent selected from the class consisting of capped isocyanates, low molecular weight alkoxy methyl melamines and condensation products of an aldehyde with an aminotriazine, an aldehyde with urea, an aldehyde with guanamine and the alkylolates of these condensation products.

In addition, the composition comprising the polyester, epoxy resin and crosslinking agent may be blended with smaller amounts of from about 0 to 8.0 parts by weight and preferably from about 2.0 to 8.0 parts by weight of a styrene copolymer obtained by copolymerizing styrene or an alkyl-substituted styrene with at least one hydroxy compound selected from the class consisting of the hydroxyalkyl acrylates, the hydroxyalkyl methacrylates or allyl alcohol, and from about 0 to 5.0, e.g. ranging from 0.01 to about 3.0 parts by weight of an acid or acid-forming catalyst.

The high solids compositions of this invention may be coated onto various substrates and particularly on metal substrates at temperatures ranging from about room or ambient temperatures up to about 250° F., depending on the viscosity of the composition and the amount of solvent, if any is necessary, and then subsequently cured at temperatures ranging up to about 400° F. The exact temperature, however, and amount of time necessary for the coating to cure will depend not only on the particular composition, i.e. the amount and type of polyester, epoxy resin and crosslinking agent, but also on the presence of a curing catalyst.

In general, the hydroxy polyester, epoxy resin and crosslinking agent are blended and then coreacted or cured, in situ, on the substrate. The curing of the polyester proceeds best in the presence of a small, but effective amount of an acid or acid-forming catalyst. Where the coating is to be applied at increased temperatures, a blocked acid-producing catalyst may be preferred not only to prolong the shelf life of the composition, but also to delay the catalytic reaction until the composition has reached the temperature at which the catalyst is effective. Typical high temperature catalysts may include, for example, sodium sulfated-dioctyl succinate, the amino salts, e.g. morpholine salt of para-toluenesulfonic acid or para-toluenesulfonic acid blocked with an alcohol, etc. In the absence of a curing catalyst, it may be necessary, in some instances, to use substantially higher curing temperatures in order to accomplish the crosslinking or curing of the coating. Other catalyst that may be used are generally known compounds and may include, for example, any of the acids such as the organic and inorganic acids, e.g. sulfuric acid, hydrochloric acid, phosphoric acid and the acid salts such as ammonia sulfate, ammonia chloride, the aromatic acids such as phthalic acid, benzoic acid, sulfonic acids and various other aliphatic and organic acids such as acetic acid, proponic acid, butyric acid, etc.

Since the coatings have a solids content of at least about 80% by weight, the composition may include small amounts of organic solvent. By adjusting the viscosity, e.g. temperatures and/or solvents, these coatings may be applied by conventional methods to various substrates, including, for example, electrostatic spray, brushing, air spraying, dip coating, curtain coating, flow coating, etc. A typical example of spraying the polyester coatings in accordance with this invention comprises the use of a spray gun operated at atomization pressures of about 20 to 100 psi and preferably at atomization pressures of 30 to 80 psi at flow rates of approximately 10 to 60 ounces of coating per minute. Generally, the coatings are applied to the substrate with several passes of the gun until films ranging from about 0.5 to 10 mils thickness are obtained. However, coatings or films ranging from 2 to 4 mils thickness are preferred. The coated substrates are then heated to temperatures ranging up to about 400° F. for various periods of time depending upon the composition of the coating and generally for periods which range up to 30 minutes until a cured or crosslinked film is obtained.

For example, a particularly high solids coating of this invention (e.g. approximately 91% of non-volatile material or 86% non-volatile volume) can be reduced to application viscosity by heating the composition e.g. up to about 250° F. and with the addition thereto of a comparatively small amount of solvent or by both heating and the addition of solvents. The high temperature application alone permits the composition to be applied at solid levels about 80% non-volatile volume. The high temperature I.C.I. cone and plate viscometer readings indicate that the 86% NVV compositions reach application viscosity (less than one poise) at about 180° F. Successful applications of the coating at this temperature have been completed and typical I.C.I. viscosity measurements for some compositions are indicated below.

| Temperature in °F. | Viscosity (Poise) |
|---|---|
| 122 | 4.0 |
| 167 | 1.2 |
| 212 | 0.6 |

As indicated, in addition to applying the high solids composition as a hot melt, the composition may contain a solvent and applied by conventional methods at about room temperature or above. For example, approximately 100 parts by weight of a 90% NVM (86% NVV) composition of this invention can be reduced to about room temperature application viscosity of about 0.8 poise (30 seconds, No. 4 Ford cup) by the addition of about 20 parts by weight of an organic solvent. These solvents may be used in amounts ranging up to about 20% by weight, e.g. 1 to 20% or less than 10% by weight and include, for example, solvents most commonly used in the enamel and lacquer industry, such as xylene, toluene, benzene, the acetates, e.g. butyl acetate, isopropyl acetate, cellosolve acetate, the ketones such as methylethyl ketone, methylisobutyl ketone, acetone, the alcohols such as methyl alcohol, ethyl alcohol, propyl alcohol, butyl alcohol, the cellosolves, the aliphatic, cycloaliphatic or aromatic hydrocarbons and various other known solvents, e.g. esters, ethers or ketones and different combinations thereof in any proportion.

The crosslinking agents capable of reacting with the hydroxy-containing low molecular weight polyesters of this invention include the amino condensation products obtained by reacting at least one aldehyde such as formaldehyde with an aminotriazine e.g. melamine, guanamine, e.g. acetoguanamine or benzoguanamine and the ureas. Also included are the alkyl and aryl-substituted derivatives of these compounds such as the cyclic ureas, the alkyl or aryl substituted melamines, the substituted guanamines, etc. These particular amino crosslinking agents are well known and may be obtained, for example, by reacting an aldehyde with an aminotriazine, urea or guanamine under condensation reaction conditions. These amino-aldehyde products have functional groups, e.g. hydroxyl groups capable of reacting with or crosslink the hydroxy-containing polyesters. In addition, the functional groups, i.e. the hydroxyl groups, of the aldehyde-amino condensation products, e.g. methylol melamine may be at least partially alkylolated with a low molecular weight alcohol, e.g. $C_1$–$C_4$ alcohols and particularly with methyl alcohol to obtain the alkylolated amino-aldehyde products, e.g. methoxy methyl melamine which are capable of crosslinking or reacting with the hydroxy-containing polyesters. Specifically, formaldehyde may be condensed with urea, guanamine and particularly melamine to form, for example, hexamethylol melamine which may be further alkylolated with a low molecular weight alcohol having 1 to 4 carbon atoms, e.g. methanol or ethanol to form the corresponding lower alkoxy methyl melamine, e.g. hexakis (alkoxy methyl melamine) or hexakis (methoxy methyl melamine). Although formaldehyde is generally used, other aldehydes that may be useful include acetaldehyde, crotoaldehyde, benzylaldehyde, acrolein, furfural, etc. These amino crosslinking agents are known in the art and may be prepared by methods recited in the literature, and more particularly, for example, as set forth in U.S. Pat. Nos. 2,197,357 and 2,191,957.

In addition to the amino type crosslinking agents, various isocyanates which are substantially inert at ambient temperatures but reactive at curing temperatures ranging up to 400° F. may be used as crosslinking agents. Of the various isocyanates, the amine blocked isocyanates are preferred since they are generally inert as curing agents at room temperatures, but at elevated temperatures the amine and isocyanate groups are converted to substituted urea. This reaction, however, is reversible at higher temperatures, e.g. up to about 400° F. where the blocked isocyanates revert to the free amine and isocyanate groups allowing the latter to function as the crosslinking agent by reacting with the hydroxyl groups i.e. the hydroxy groups of the hydroxy-containing polyester. More specifically, the isocyanates useful for purposes of this invention, contain two or more isocyanate groups and include the alkyl, cycloalkyl, aryl, aralkyl or alkaryl polyisocyanates. It is preferred to employ the aryl diisocyanates such as 2,4-diisocyanato toluene or 2,4-tolylene diisocyanate or combinations thereof. Specifically, particularly useful isocyanates include the 1,2-diisocyanato ethane, 1,3-diisocyanato propane, 1,4-diisocyanato butane, 1,5-diisocyanato pentane, 1,6-diisocyanato hexane, 1,8-diisocyanato octane, 1,9-diisocyanato nonane, 1,10-diisocyanato decane, 2,4-diisocyanato toluene, 1,3-diisocyanato xylene, 2,4-diisocyanato 1-chlorobenzene, 2,5-diisocyanato 1-methoxy benzene, 1,3-diisocyanato cyclohexane, 1,4-diisocyanato naphthalene, etc.

In addition to the amine-blocked isocyanates, other isocyanates where the isocyanate groups have been blocked or reacted with a polyol, e.g. alcohol, are useful. Again, these alcohol blocked isocyanates are stable at about room temperature, but become reactive with other hydroxyl groups at elevated temperature. As indicated above, these compounds include, for example, the aliphatic isocyanates such as trimethylene, tetramethylene, pentamethylene, hexamethylene, 1,2-propylene, 1,2-butylene, 1,3-butylene, 2,3-butylene, ethylidene or butylidene diisocyanates. Included also are the cycloalkylene isocyanates such as 1,3-cyclopentane, 1,4-cyclohexane or 1,2-cyclohexane diisocyanates. In addition to the aliphatics, the aromatics include phenylene, paraphenylene, 4,4'-diphenyl, 1,5-naphthalene and 1,4-naphthalene diisocyanates. The aliphatic aromatic diisocyanates include, for example, the 4,4'-diphenylene methane, 2,4- or 2,6-tolylene and mixtures thereof and 4,4'-toluidine or 1,4-xylylene diisocyanates, the halo, e.g. chlorodiphenylene diisocyanate and the triisocyanates such as triphenyl methane-4,4',4'-triisocyanate, 1,3,5-triisocyanate benzene, 2,4,6-triisocyanate toluene and the various tetraisocyanate.

In preparing the alcohol blocked isocyanates, various aliphatic, cycloaliphatic or aromatic alcohols may be used as blocking agents. These may include, for example, the aliphatic alcohols such as methyl, ethyl, propyl, butyl, amyl, hexyl, heptyl or octyl alcohol and the cycloaliphatic alcohols such as cyclopentanol, cyclohexanol, etc. As indicated, other blocking agents include the hydroxyl amines such as ethanolamine, propanolamine, etc., the oximes such as methylethyl ketone oxime, acetone oxime, etc. The blocked isocyanates are formed by reacting sufficient quantities of the blocking agent with the isocyanate under conditions to insure that there are substantially no free or unreacted isocyanate groups. This reaction is exothermic and, therefore, the polyisocyanate and the blocking agent are preferably mixed at temperatures below about 75° C. and more preferably below about 50° C.

The polyesters crosslinked with the above-mentioned crosslinking agents are characterized as esters derived from carboxylic acids and polyols and as having a hydroxyl content ranging from about 2.0 to 12% by weight and average molecular weights not in excess of about 1200 and preferably ranging from about 200 to 1000. More specifically, the polyesters, for purposes of this invention, are derived from aromatic and/or aliphatic carboxylic acids, the anhydrides thereof and various aliphatic and/or aromatic polyols. The carboxylic acids, e.g. having up to 16 carbon atoms or more include the saturated and unsaturated polycarboxylic acids and the derivatives thereof, such as maleic acid, fumaric acid, itaconic acid, oleic acid, malonic acid, alkyl malonic, e.g. ethyl malonic acid, succinic acid, the alkyl succinic acid, e.g. methyl succinic acid, 1,2-diethyl succinic glutaric acid, ethyl glutaric acid, amyl glutaric acid, dimethyl glutaric acid, adipic acid, alkyl adipic acid, e.g. butyl adipic acid, pimelic acid, methyl-pimelic acid, propyl pimelic acid, sebacic acid, ethyl sebacic acid, azelaic acid, methyl azelaic acid, and the cycloaliphatic dicarboxylic acids such as dicyclopentadiene dicarboxylic acid. The carboxylic acids include also the aromatic polycarboxylic acids, such as phthalic acid, isophthalic acid, terphthalic acid, tetrahydrophthalic anhydride, Nadic anhydride including the anhydrides and particularly mixtures of the aliphatic and aromatic polycarboxylic acids or anhydrides in any relative proportion, e.g. 1.0 to 99% by weight.

These carboxylic acids, the anhydrides and mixtures thereof are esterified by known methods with an excess amount of a polyhydric alcohol, preferably alcohols containing 2 or 3 hydroxyl groups per molecule and include, for example, ethylene glycol, diethylene glycol, triethylene glycol, tetraethylene glycol, dipropylene glycol, tripropylene glycol, dibutylene glycol and various other alkylene glycols wherein the alkylene radical has from 2 to 8 carbon atoms. Other polyhydric alcohols include the glycerols, the ethers of glycerol, the alkane diol such as 1,2-butane diol, 2,3-hexane diol, 2,4-hexane diol, etc., erythritol, pentaerythritol, arabital, sorbitol, 1,2-cyclohexane diol, etc.

The epoxy resins or polyepoxides, mixed with the hydroxy-containing polyesters and crosslinking agents are polymers obtained essentially by condensing a polyhydric compound with an epihalohydrin such as epichlorohydrin including, for example, the condensation of a polyhydric alcohol or a dihydric phenol, e.g. diphenylol propane with epichlorohydrin under alkaline conditions. Some of these condensation products are commercially available as Epon resins and may be prepared in accordance with methods well known in the art as set forth, for example, in U.S. Pat. Nos. 2,592,560; 2,582,985 and 2,694,694. Of the various epoxy resins, a class of preferred epoxy condensation products contain two visepoxy moieties, i.e. 1,2-oxirane moieties per molecule and on the average at least one hydroxyl moiety attached to an aliphatic carbon atom.

For purposes of this invention, the styrene copolymers are prepared by reacting styrene or a substituted styrene with either a hydroxyalkyl acrylate or methacrylate and an allyl alcohol. Preferably, the styrene copolymers are prepared by reacting styrene with a hydroxyalkyl acrylate. The hydroxyalkyl acrylates have a hydroxy content ranging up to about 25%, e.g. from about 2 to 12% by weight and include acrylates wherein the alkyl group has from 1 to 12 aliphatic carbon atoms. The hydroxyalkyl acrylates include not only the mono- and polyacrylates or mono- and polyacrylates such as the mono- or polyhydroxy alkyl di- and triacrylates or alkacrylates, e.g. the methacrylates and ethacrylates, but also the halogen-substituted acrylates such as the chlorine or bromine substituted mono- or polyhydroxy alkyl acrylates e.g. the mono- or polyhydroxy alkyl chloroacrylates or hydroxychloroalkyl diacrylates or dialkacrylates. More specifically, the hydroxyalkyl acrylates, for purposes of this invention, may be characterized by the formula:

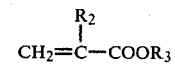

wherein $R_2$ is either hydrogen, a halogen, e.g. chlorine or bromine, an alkyl or substituted alkyl group, e.g. halogen-substituted alkyl group wherein the alkyl group has 1 to 2 carbon atoms and $R_3$ is a mono- or polyhydroxyalkyl or substituted alkyl, e.g. halogen-substituted hydroxyalkyl group having up to 12 and preferably 2 to 8 aliphatic carbon atoms.

These acrylates may be described as esters of acrylic or substituted-acrylic acid including, for example, 2-hydroxypropyl acrylate, 3-hydroxybutyl acrylate, 4-hydroxypentyl acrylate, 5-hydroxypentyl acrylate, 5-hydroxyhexyl acrylate, 2-hydroxybutyl acrylate, 2- hydroxyethyl methacrylate, 2-hydroxyethyl chloroacrylate, 2-hydroxyethyl acrylate, 2-hydroxyethyl ethacrylate, hydroxybutyl ethacrylate, 3-hydroxypropyl methacrylate, 3-hydroxypropyl chloroacrylate, 3-hydroxybutyl acrylate, 4-hydroxybutyl methacrylate, 3-hydroxybutyl ethacrylate, 3-hydroxypropyl ethacrylate, 3-hydroxybutyl chloroacrylate, 3-hydroxypropyl acrylate, 3-hydroxypropyl 2-chloroacrylate, 4-hydroxybutyl acrylate, 3-hydroxyethyl 2-chloroacrylate, 3-hydroxybutyl chloromethacrylate, 5-hydroxypentyl acrylate, 2-hydroxypropyl chloromethacrylate, 5-hydroxypentyl methacrylate, 6-hydroxyhexyl acrylate, 2-hydroxybutyl chloromethacrylate, 2-hydroxyethyl chloroethacrylate, 3-hydroxybutyl methacrylate, 2-hydroxyethyl chloromethacrylate, 2-hydroxypropyl chloroethacrylate, 2-hydroxybutyl dichloroethacrylate, 2-hydroxybutyl chloromethacrylate, 3-hydroxypropyl chloromethacrylate, 3-hydroxypropyl chloroethacrylate, 3-hydroxyhexyl chloromethacrylate, 3-hydroxypentyl 2-chloroacrylate, 3-hydroxybutyl bromomethacrylate, 2-hydroxybutyl chloromethacrylate, 4-hydroxybutyl 2-chloroethacrylate, 3-hydroxypentyl 2-chloroethacrylate, 3-hydroxypropyl 2-bromoethacrylate, 4-hydroxybutyl 2-bromoethacrylate, 5-hydroxyhexyl methacrylate, 6-hydroxypentyl chloromethacrylate and various other vinyl or acrylic esters containing at least one free alcoholic hydroxyl group, e.g. a mono- or polyhydroxy alkyl ester of acrylic, methacrylic or ethacrylic acid.

Other acrylic esters that may be used which have at least one free hydroxyl group include polyethylene glycol methacrylate, diethylene glycol methacrylate, triethylene glycol methacrylate, tetraethylene glycol methacrylate, dipropylene glycol methacrylate, tetraethylene glycol chloroacrylate, tetraethylene glycol acrylate, tetraethylene glycol dichloroacrylate, glycerol methacrylate, pentaerythritol methacrylate, diethylene glycol monoacrylate, triethylene glycol monoacrylate, dipropylene glycol monoacrylate, trimethylol ethane diacrylate, trimethylol propane diacrylate, pentaerythritol triacrylate, glycerol acrylate, pentaerythritol monoacrylate, trimethylol ethane monoacrylate, trimethylol propane monoacrylate, trimethylol ethane chloroacrylate, trimethylol propane methacrylate, trimethylol butane methacrylate, tetramethylene glycol chloroacrylate, triethylene glycol methacrylate, tetraethylene glycol acrylate, pentaerythritol dichloroacrylate, dipentaerythritol diacrylate, dipentaerythritol triacrylate pentaerythritol dimethacrylate, pentaerythritol methacrylate and combinations of any of these hydroxy-containing acrylates in various proportions.

The styrene copolymerized with the hydroxyalkyl acrylate may be characterized by the formula:

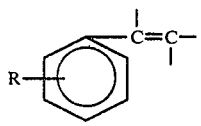

wherein R is hydrogen or an alkyl group of 1 to 4 carbon atoms, e.g. tertiarybutyl styrene and is present in amounts ranging from about 10 to 60% and preferably in amounts ranging from 25 to 30 parts by weight of the total reactants. The alkyl-substituted styrene may be either an ortho-, meta- or para- alkyl-substituted styrene such as para-substituted tertiary-butyl styrene.

The free-radical initiators or catalyst useful in preparing the styrene copolymers include the organic peroxides and compounds which decompose to produce free-radicals under the reaction conditions as well as various forms of actinic radiation, e.g. ultra-violet light, x-rays, etc. In addition, other catalysts include the azo compounds, the redox catalyst and particularly the peroxy esters or dialkyl peroxides having a half-life of 1 to 5 hours at temperatures of 250° F., e.g. perbenzoates, etc. Specific examples of the peroxides include 2,2-bis(tertiary-butyl peroxy) butane, tertiary-butyl hydroxy peroxide, ditertiary-butyl peroxide, tertiary-butylpropyl peroxide, tertiary-butyl pentamethylethyl peroxide, acetyl peroxide, diisopropylbenzene hydroperoxide, etc.

In formulating the coating composition, it is generally desirable to incorporate in the mixture of the hydroxy polyester and the crosslinking agent, e.g. the aminoaldehyde compound a small but effective amount or a catalytic amount of a curing catalyst. The catalyst is used to catalyze the reaction between the hydroxy polyester and the crosslinking agent during the curing cycle, e.g. upon being heated to temperatures ranging up to about 400° F. The reaction between the crosslinking agents and the other polymers, e.g. the hydroxy-containing polyester, epoxy resin and, if desirable, the styrene copolymer takes place, in situ, at increased temperatures to form a cured film. The film has characteristics needed as a finished coating on various appliances such as washing machines, dryers, refrigerators, freezers, automobiles or similar appliances.

The coating composition usually contains significant amounts of one or more inorganic compounds known generally as pigments which may be present in amounts ranging up to 60% or more by weight of the total composition. These pigments, for example, include various metal oxides, e.g. titanium dioxide, zinc oxide, the hydroxides, metal flakes, metal powders, the chromates, the sulfides, the carbonates, carbon black, talc and the organic dyes or the like. In addition, other well known additives may be incorporated in the coatings and particularly, for purposes of this invention, include flow agents, e.g. silicones, surface active agents or wetting agents, etc.

The following example illustrates the preparation of the hydroxy-containing polyesters and the use thereof in preparing the coating compositions of this invention.

EXAMPLE 1

| Reactants | Parts by Weight |
|---|---|
| 2,2,4-trimethyl 1,3-pentane diol | 561.17 |
| Adipic acid | 132.05 |
| Isophthalic acid | 210.43 |
| Dibutyl tin oxide | 4.54 |
| Cellosolve acetate | 91.81 |

The above reactants were added to the reactor equipped with a fractionating column and a thermometer. The diol, adipic acid, part of the isophthalic acid and the dibutyl tin oxide were added to the reactor and the mixture was heated to about 250° F. After melting agitation was started and the temperature was increased to 360° F. At this temperature, the remaining portion of the isophthalic acid was added to the reactor which was then held at 360° F. for a period of about 2½ hours. The reaction mixture was then heated to about 385° F. at which point the reaction product appeared clear and acid values were taken. When the acid value fell below 10, the temperature of the reaction mixture was lowered to about 250° F. and the cellusolve acetate was added to the mixture. The reaction mixture was then cooled and a polyester having an average molecular weight of about 600 was obtained.

The hydroxy-containing polyester of Example 1, having a an average molecular weight of about 600, was used to prepare a coating composition having a low viscosity from the following:

EXAMPLE 2

| Components | Parts by Weight |
| --- | --- |
| Polyester of Example 1 | 65 |
| Methoxy Methyl Melamine Crosslinking Agent (Resimene X-745) | 25 |
| Epoxy Resin (Epon 1001) | 5 |
| Styrene-acrylic Copolymer (Styrene-Hydroxy Propyl Acrylate) | 5 |

The coating derived from the above composition was characterized as being approximately 91% of nonvolatile material (NVM). The coating was pigmented to 18% PVC (pigment volume concentration) by adding to the composition sufficient titanium dioxide mixed with cellosolve acetate to obtain the desired NVM and then catalyzed with an acid i.e. sodium sulfated dioctyl succinate.

A coating composition was prepared from the following components.

EXAMPLE 3

| Components | Parts by Weight |
| --- | --- |
| Polyester Resin in Example 1 | 65 |
| Methoxy Methyl Melamine Crosslinking Agent | 25 |
| Epoxy Resin (Epon 1001) | 5 |
| Styrene-Allyl Alcohol Copolymer | 5 |
| Silicone Flow Agent | <1 |

The above coating had a high solids content and characterized as being approximately 91% NVM. Because of the composition's low viscosity, the coating was applied at an increased temperature with hot spray equipment, e.g. at temperatures of approximately 190° F. At these temperatures, the composition had a viscosity of approximately 20 seconds of 2 Zahn cup (less than 1 poise viscosity) This composition was metered into a Ransburg disc and electrostatically sprayed onto the substrate. The coating was then cured in about 25 minutes at temperatures ranging up to about 400° F. to form a hard-stain resistant finish.

From the following composition, an architectural coating composition was prepared which had a viscosity of approximately 700 to 1150 centipoise. After it was applied and baked at temperatures ranging up to about 350° F., the film had a 60 degree gloss of approximately 60, a 3H or higher pencil hardness and excellent exterior durability.

EXAMPLE 4

| Components | Parts by Weight |
| --- | --- |
| Polyester of Example 1 | 387.3 |
| Styrene-Hydroxyacrylate Copolymer | 17.5 |
| Methoxy Methyl Melamine | |

-continued

| Components | Parts by Weight |
| --- | --- |
| Crosslinking Agent | 157.6 |
| Epoxy Resin | 33.0 |
| Cellosolve Acetate | 73.0 |
| Titanium Dioxide | 602.1 |
| Sodium Sulfated Dioctyl Succinate | 6.7 |
| Talc | 58.2 |

Preferred coatings are prepared by using a combination of the polyester with the epoxy resin and a crosslinking agent in the presence of an acid catalyst as illustrated in the following Examples.

EXAMPLE 5

| Components | Parts by Weight |
| --- | --- |
| Polyester of Example 1 | 30.5 |
| Methoxy Methyl Melamine Crosslinking Agent | 11.9 |
| Epoxy Resin (Epon 828) | 2.5 |
| Pigment (TiO$_2$) | 45.3 |
| Dioctyl Succinate Catalyst | 0.2 |
| Solvent (2-ethoxy ethyl acetate) | 8.6 |
| Flow Agent (Fluorocarbon) | 0.5 |

EXAMPLE 6

| Components | Parts by Weight |
| --- | --- |
| Polyester of Example 1 (Mol. Wt. of 608) | 32.3 |
| Methoxy Methyl Melamine Crosslinking Agent | 9.2 |
| Epoxy Resin (Epon 1001) | 2.6 |
| Pigment (TiO$_2$) | 47.9 |
| Dioctyl Succinate | 0.2 |
| Solvent | 6.9 |
| Flow Agent (Silicone) | 0.5 |

While this invention has been described by a number of specific embodiments it is obvious that other variations and modifications may be made without departing from the spirit and the scope of the invention as set forth in the appended claims.

What is claimed is:

1. A method for preparing a hard flexible film on a substrate which comprises coating the substrate at temperatures ranging up to about 250° F. with an effective amount of a high-solids coating composition and subsequently curing the coated substrate at temperatures ranging up to about 400° F.; said high-solids coating composition comprising from about 50 to 80 parts by weight of a polyester having an average molecular weight ranging up to about 1200 and a hydroxy content ranging from 2.0 to 12% by weight, about 10 to 40 parts by weight of at least one crosslinking agent selected from the class consisting of lower alkoxy methyl melamines, and condensation products of an aldehyde with an aminotriazine, aldehyde with urea, aldehyde with guanamine and said condensation products alkylolated with alcohol having 1 to 4 carbon atoms, about 2.0 to 10 parts by weight of a polyepoxide, about 2.0 to 8.0 parts by weight of a copolymer obtained by copolymerizing styrene or an alkyl-substituted styrene with at least one hydroxy compound selected from the class consisting of hydroxyalkyl acrylates and allyl alcohol, and up to about 5.0 parts by weight of an acid catalyst.

2. The method of claim 1 further characterized in that an organic solvent is present in an amount ranging from about 1.0 to 20% by weight of the composition.

3. The method of claim 2 further characterized in that the organic solvent is present in an amount ranging up to about 10% by weight of the composition.

4. The method of claim 1 further characterized in that the high solids composition is coated onto the substrate above ambient temperatures.

5. The method of claim 1 further characterized in that an inorganic pigment is present in an amount ranging up to about 60% by weight of the composition.

* * * * *